United States Patent [19]

Kagerer

[11] 4,063,488
[45] Dec. 20, 1977

[54] TOOL CHUCK
[75] Inventor: Franz Kagerer, Munich, Germany
[73] Assignee: Friedrich Deckel Aktiengesellschaft, Munich, Germany
[21] Appl. No.: 766,555
[22] Filed: Feb. 7, 1977
[30] Foreign Application Priority Data
    Feb. 17, 1976 Germany .............................. 2606215
[51] Int. Cl.² ............................................... B23C 5/26
[52] U.S. Cl. ........................................ 90/11 D; 279/57
[58] Field of Search ................... 90/11 D; 408/239 A; 279/55, 57, 66

[56] References Cited
U.S. PATENT DOCUMENTS
3,474,705  10/1969  Jacob, Jr. .............................. 90/11 D
3,568,566  3/1971   Weidig ................................. 90/11 D Primary Examiner—Gil Weidenfeld
Attorney, Agent, or Firm—Blanchard, Flynn, Thiel, Boutell & Tanis

[57] ABSTRACT

An improved tool chuck having a draw-in rod axially movably located inside a tool spindle and attached to a locking head which is positively engageable with a tang on a tool. Locking members are provided and are each movably contained in radial openings in the wall of the locking head and adapted to be pushed by a control sleeve embracing the locking head into recesses in the tang of the tool. The locking members have circular-shaped segments thereon located to face radially inwardly with part of the circular edges being slidable in slots on faces having a complementary shape and being adapted to engage the tang at the end of the tool shank.

5 Claims, 3 Drawing Figures

TOOL CHUCK

FIELD OF THE INVENTION

The invention relates to a tool chuck and, more particularly to a tool chuck provided with a draw-in rod axially movably located inside a tool spindle and attached to a locking head which is positively engageable with the tang of a tool, and which comprises locking members movably contained in radial openings in the wall of the locking head and adapted to be pushed by a control sleeve embracing the locking head into recesses in the tang of the tool.

BACKGROUND OF THE INVENTION

Such tool chucks and their freely movable locking members have the advantage of great simplicity over conventional arrangements using spring-loaded or pivoted gripping claws (e.g. German Pat. Specn. No. 1 246 967).

A chuck of the specified kind has already been proposed in which the locking members are sliding blocks that are movable in a purely radial direction (British magazine "Machines & Tooling", 1974, No. 2, Page 35, Figure 3c). When forced inwardly, projections on the sliding blocks extending radially inwards engage a collar formed on the tang of the tool. Release of the tool is effected by virtue of the contacting faces of the projections and the collar having sloping wedge faces which generate a radial thrust for displacing the sliding blocks when an axial load acts on the tool. In cross section, the sliding blocks are cylindrical for the purpose of keeping the cost of machining the blocks as well as their ways within reasonable bounds. However, it is clearly necessary to prevent the sliding blocks from turning in their slideways to ensure that the intended face of each block will in fact engage the tang of the tool. Moreover, in this prior arrangement the sliding blocks must be provided with stop faces to prevent them from dropping out of their ways when there is no tool in the chuck. For these reasons as well as because of the necessary provision of inclined faces production is complicated and rather expensive.

Another drawback of this known form of construction is that the inclined faces apply considerable radial forces and tilting moments to the sliding blocks and their ways so that they are liable to jam and to suffer considerable wear.

It is an object of the present invention to provide a tool chuck of the specified kind which is reliable in operation, which is less liable to wear, and which is also inexpensive to produce.

According to the invention, this is achieved by features wherein the locking members have the basic shape of circular segments each located with its circularly arcuate edge facing radially inwards, part of the edge being slidable in slots on faces of complementary shape and at least part being adapted to engage the tang at the end of the tool shank.

The locking members have a configuration that is easy to produce. For instance, several locking members may be associated in a full circle and their circularly arcuate edges jointly machined at the same time. The slideways respectively slots can also be easily produced by discshaped milling cutters.

Release by the locking members is effected by their circular sliding movement about the notional center of the arcuate edge.

According to the invention, part of the circularly arcuate edge projecting radially inwardly through the locating slot is arranged to engage the tang of the tool. More particularly, this may be formed with a neb which positively engages recesses formed in the tang of the tool. During the releasing motion, this neb swings away from the tang and thus permits the tool to be withdrawn. The contacting surfaces between the neb and the collar formed on the tang are preferebly normal to the spindle axis, a feature which also facilitates machining the locking members and the tang on the taper shank of the tool.

Moreover, in order to bring about the locking movement, the edges of the locking members which face radially outwardly have a cam contour which slopes outwards in releasing direction for engagement by the control sleeve when the draw-in rod is retracted and thus to force the locking members inwards again.

BRIEF DESCRIPTION OF THE DRAWINGS

Other features and advantages of the invention will be more particularly described with reference to an embodiment. This is shown in the drawings, in which.

DETAILED DESCRIPTION

Figure 1:
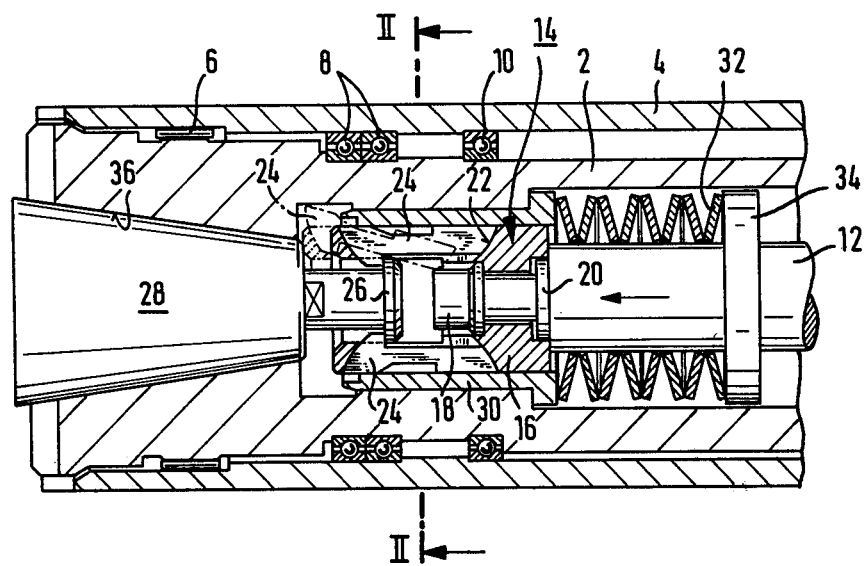
FIG. 1 is a longitudinal sectional view of a tool spindle containing locking means adjacent the tapered socket.
Figure 2:
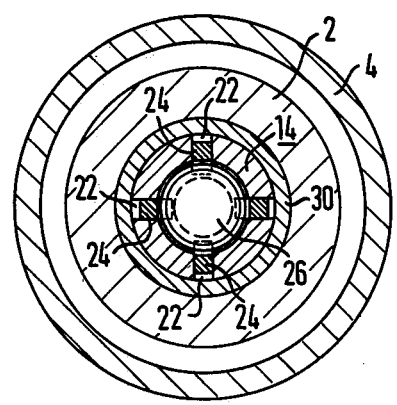
FIG. 2 is a cross section of a tool spindle taken along the line II—II in FIG. 1.

A tool spindle 2 in FIGS. 1 and 2 is rotatably mounted in a spindle sleeve 4 in antifriction bearings 6, 8 and 10, but is not axially movable. The tool spindle drive is conventional and therefore not shown in the drawings.

Inside the hollow tool spindle 2 is an axially movable draw-in rod 12 and has at its end adjacent the tool a locking head 14. This locking head consists substantially of a bushing 16 which is secured to the end of the draw-in rod 12 by a fixing bolt 18. A projecting face or shoulder 20 formed on the end of the draw-in rod 12 is received in a central recess in the bushing 16 and centers the locking head 14 on the rod.

The bushing 16 forming the locking head is provided around its periphery with angularly spaced slots 22 in which locking members 24 are located for sliding deflection about an axis normal to the spindle axis.

Figure 3:
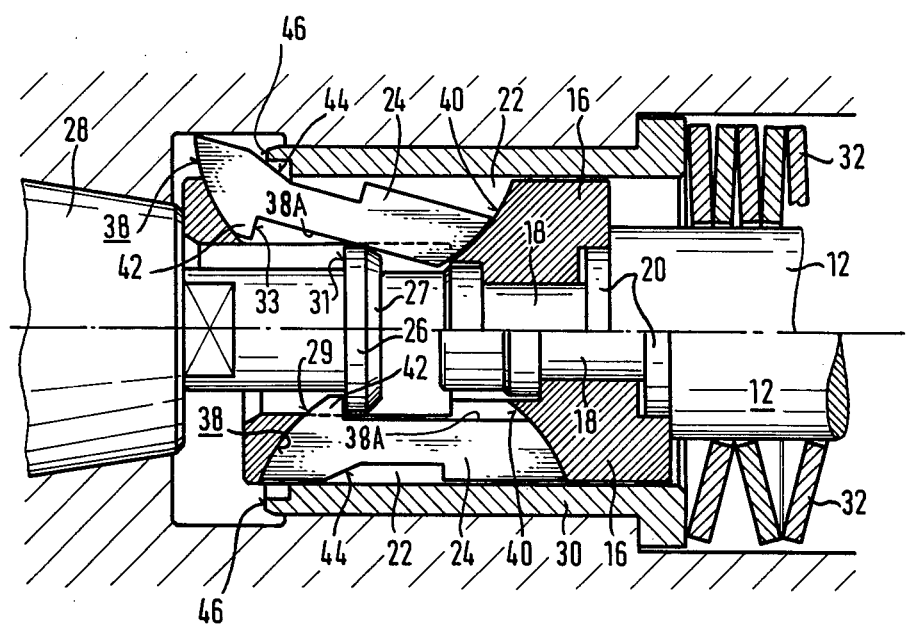
FIG. 3 is an enlarged fragmentary longitudinal sectional view corresponding to FIG. 1.

The locking members 24 each have a shoulder 24A thereon and can assume (1) a locking position in which the shoulders 24A positively engage the back of a collar 26 on the tang of the tool shank 28 to keep the tool in position (lower half of FIG. 3), and (2) a releasing position in which the shoulders 24A are disengaged from the tang to release the tool (upper half of FIG. 3). A deflection of the locking members 24 into the locking position is brought about during a retraction of the draw-in rod 12 by a control sleeve 30 which surrounds the locking head 14 and pushes the locking members radially inwards. During the ejecting movement of the draw-in rod 12 the locking members 24 are released by the control sleeve 30 for disengagment from the collar 26, so that the collar 26 can push them outwards when the tool is being inserted or removed, as will be later described in greater detail.

A retraction of the draw-in rod 12 is effected in conventional manner by a compression spring 32 which bears at one end against a collar 34 on the draw-in rod 12 while its other end is supported by the end of the control sleeve 30 which is axially fixed inside the spindle. The ejecting movement can be effected by any desired known type of device not shown in the drawings, but which may be manually or hydraulically operable. As will be understood by reference to FIG. 1, the fixing bolt 18 will be driven leftwardly and be displaced into contact with the free end of the collar 26 and the tang on the taper shank 28 and thus displace the tool from the socket 36 in the spindle 2.

FIG. 3 is an enlarged representation of the tool chuck shown in FIGS. 1 and 2, the upper half of the drawings showing the chuck in the released position and the lower half showing the chuck in the engaging position.

The shape of the ends of the locking members 24 is basically that of circular segments. The circular arcuate edge 38 of each segment at the opposite ends thereof faces the inside or radially inwardly and engages complementary surfaces 40 at the axial ends of the locating slots 22. Each locking member 24 is therefore capable of being slidably displaced about the notional center of the circular arc defined by the edges 38.

The upper half of FIG. 3 shows a locking member 24 in a position into which it has been slidably deflected radially outward to project outwards into a releasing position to permit the taper shank of the tool to be withdrawn or inserted. If the locking members 24 should not assume this position automatically by the effect of their own weight, they will be positively displaced into the same by the collar 26 on the tang of the tool. For this purpose, the collar 26 at the end of the tang has a beveled edge 27 which will slidably engage that part of the edge 38A which projects into the path of the tang as the tool is being inserted, and which will thus deflect the locking member 24 outwards. When the tool is withdrawn, the side 31 of the collar 26 facing the shank of the tool 28 will make contact with a neb 42 on the locking collar and which serves as a cam edge, and the wedge action generated between the two faces 33 and 38 will then cause the locking member 24 to yield by swinging outwards.

When the tool has been inserted, the draw-in rod 12 is retracted by the compression spring 32, i.e. displaced to the right in FIG. 3. This results in the external sloping cam edges 44 of the locking members to be pulled against the outer left axial end edge 46 of the control sleeve 30 and to be thus pushed back radially inwards. The nebs 42 engage the inside face of the collar 26 and pull the tool tightly into the taper socket 36.

For releasing the tool, the releasing means are actuated and the draw-in rod 12 is pushed to the left. This results in the locking members 24 being pushed free of the control sleeve 30 and at the same time the head of the fixing bolt 18 forces the tool out of the taper socket so that it can be easily withdrawn.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A tool chuck provided with a draw-in rod axially movably located inside a tool spindle and attached to a locking head which is positively engageable with the tang of a tool, and which comprises locking members movably contained in radial openings in the wall of the locking head and adapted to be pushed by a control sleeve embracing the locking head into recesses in the tang of the tool, said locking members having the form of sliding members which are substantially radially movable in suitably contrived ways, comprising the improvement wherein the locking members have the basic shape of circular segments each located with its circularly arcuate edge facing radially inwards, part of said edge being slidable in slots on faces of complementary shape and at least part being adapted to engage the tang at the end of the tool shank.

2. An improved tool chuck according to claim 1, wherein the edges of the locking members which face radially inwards are formed with a neb for positively engaging recesses formed on the tang of the tool shank.

3. An improved chuck according to claim 2, wherein the nebs engage the inside face of a collar formed on the end of the tang of the tool shank.

4. An improved tool chuck according to claim 2, wherein the contacting surfaces of locking member and collar on the tang of the tool shank are normal to the spindle axis.

5. An improved tool chuck according to claim 1, wherein the edge of each locking member that faces radially outwards is formed with a cam contour that slopes outwards in releasing direction and that cooperates with the edge of the outside end of the control sleeve.

* * * * *